March 29, 1949.　　　G. GISONNO　　　2,465,444
AUTOMATIC CLUTCH
Filed Feb. 6, 1947
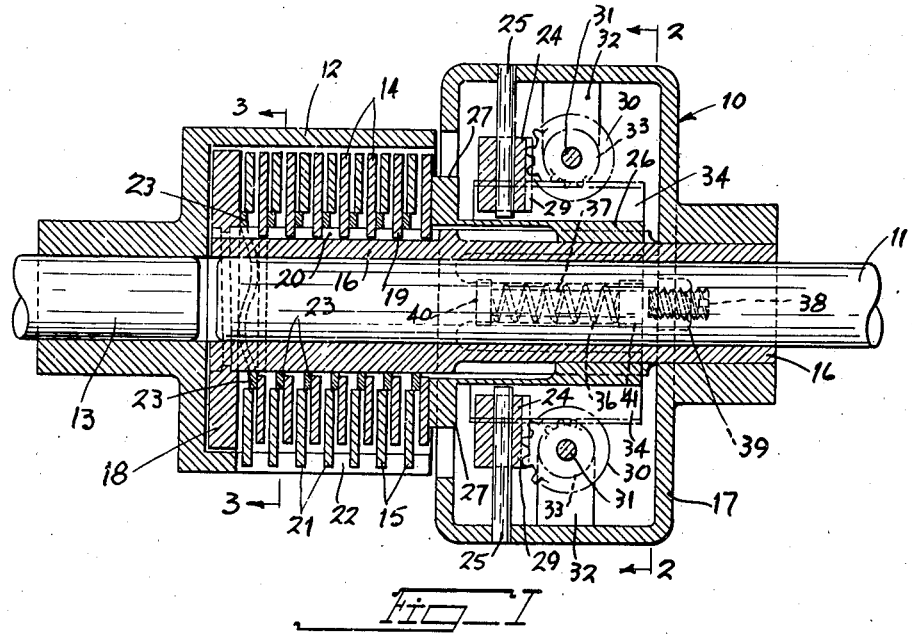
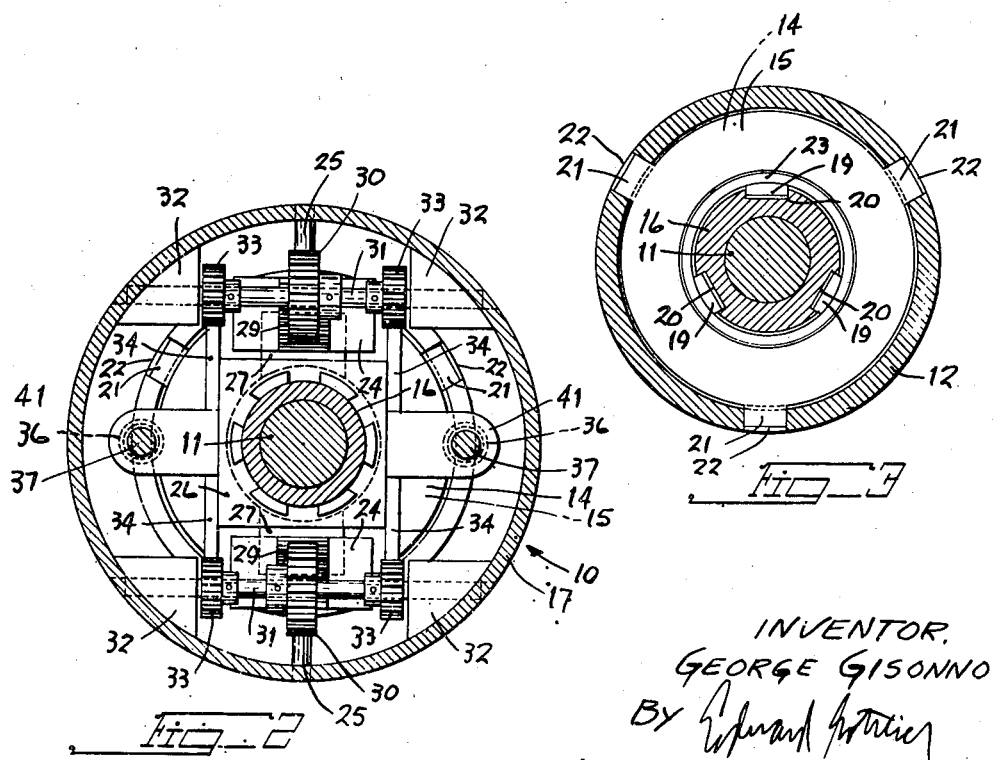
INVENTOR.
GEORGE GISONNO
BY Edward Gottlieb
ATTORNEY.

Patented Mar. 29, 1949

2,465,444

UNITED STATES PATENT OFFICE 2,465,444

AUTOMATIC CLUTCH

George Gisonno, Brooklyn, N. Y.

Application February 6, 1947, Serial No. 726,820

1 Claim. (Cl. 192—105)

This invention relates to new and useful improvements in clutches, and relates particularly to an automatic clutch.

More specifically, the invention proposes a clutch which will automatically close at a predetermined speed and remain closed at speeds above said predetermined speed and which will automatically open when the speed falls down to and below said predetermined speed.

It is proposed to characterize the new and improved clutch by the fact that it includes a driver hub housing for engagement on a driver shaft, a driven hub housing for engagement upon a driven shaft, and friction members connected with said housings and engageable with each other for transmitting rotations from said driver housing to the driven housing. It is proposed to provide weights radially movably mounted on the driver housing and to provide means for operating said friction members controlled by the positions of said weights which are directly controlled by the speed of rotation of the driver housing.

Still further the invention proposes the construction of an automatic clutch as described which is simple and durable and which may be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a longitudinal sectional view of an automatic clutch constructed in accordance with this invention.

Fig. 2 is a transverse vertical sectional view taken on the line 2—2 of Fig. 1.

Fig. 3 is a transverse vertical sectional view taken on the line 3—3 of Fig. 1. The automatic clutch, in accordance with this invention, includes a driver hub housing 10 for engagement on a driver shaft 11, and a driven hub housing 12 for engagement on a driven shaft 13. One or more friction members 14 are connected with the driver housing 10 and are engageable with one or more friction members 15 connected with the driven hub housing 12 for transmitting rotations from said driver housing to said driven housing.

In the particular design of automatic clutch illustrated on the drawing the driver hub housing 10 is formed of two sections, namely, a tubular central section 16 and a container section 17. The shaft 11 engages into the tubular section 16. The tubular section 16 extends into the driven hub housing 12. The inner end of the tubular section 16 is provided with a stationary collar 18 which is threadedly engaged on the end thereof. The friction members 14 are in the nature of inner discs provided with a plurality of inner lugs 19 which engage longitudinal grooves 20 formed upon the tubular member 16. The friction members 15 are in the nature of outer discs located alternately between the inner discs 14 and provided with external lugs 21 which engage grooves 22 formed upon the driven hub housing 12.

Separator springs 23 are positioned internally of the outer discs 15 and between the inner discs 14 and act normally to urge all of said discs in slightly separated positions. This constitutes the open condition of the clutch in which no driving takes place.

One or more weights 24 are radially movably mounted on the driver housing 10. More specifically, these weights 24 are slidably mounted on radial pins 25 mounted upon the container portion 17 of the driver hub housing 10. A pressure member 26 is axially movably mounted in relation with the driver housing 10 for engaging the friction members 14 and 15. More specifically, the pressure member 26 is splined on the tubular section 16 of the housing 10 so as to be capable of sliding longitudinally. One end 27 of the pressure member 26 engages against the outermost of the friction members 14, 15.

A train of gears connects each weight 24 with the pressure member 26 for operating the pressure member by centrifugal force of the weights while the driver housing 10 rotates. Each of these gear trains includes rack teeth 29 formed upon each weight 24 and meshing with a gear 30 mounted upon a shaft 31 rotatively supported across bearings 32 formed or mounted on the driver hub housing 10. The shaft 31 is also provided with pinions 33 which mesh with racks 34 mounted or formed on the pressure member 26. The arrangement is such that when the weights 24 move outwards, the gears 30 will be turned, turning the shafts 31, the pinions 33, and causing the racks 34 to move longitudinally for moving the pressure member 26 so that the pressure member engages the friction members 14 and 15 with each other and against the stationary collar 18. In this condition the clutch is closed and capable of transmitting rotations.

Resilient means are provided for opposing the centrifugal force of the weights 24 for automatically re-opening the clutch. This resilient means comprises springs 36 acting to move the pressure member 26 longitudinally in the opposite direction to which it is moved by centrifugal force of the weights 24. The springs 36 are mounted upon studs 37 which are threadedly and thus stationarily mounted on the driver hub housing 10. The outer ends of the studs 37 are formed with slots 38 for a screw driver by which they may be adjusted. Lock nuts 39 are threadedly engaged in the outer ends of the studs 37 to hold them adjusted. The inner ends of the studs 37 are provided with heads 40 against which the springs 36 bear. The springs 36 are mounted upon the studs 37 and act between the heads 40 and lugs 41 formed on or projecting from the sides of the pressure member 26.

The operation of the automatic clutch may be understood from the following:

Rotations from the driver shaft 11 rotate the driver hub housing 10 which consists of the tubular section 16 and the container section 17 rigidly connected together. Normally, the clutch is open because of the separator springs 23 holding the friction members 14 and 15 in separated positions. Rotations of the driver hub housing 10 cause the weights 24 to move outwards due to centrifugal force. As the weights 24 move outwards the gear trains connected with said weights transmit motion to the pressure member 26 which moves longitudinally forwards and towards the friction members 14 and 15. When a predetermined speed of the driver hub housing 10 is reached the weights 24 will have assumed a position in which the pressure member 26 has moved the friction members 14 and 15 frictionally into contact with each other. Now rotations from the driver hub housing 10 will be transmitted first to the inner discs 14 and from these discs to the outer discs 15. The outer discs 15 in turn drive the driven hub housing 12 which drives the shaft 13.

The tensions of the springs 36 may be adjusted for controlling the speed at which the automatic clutch closes and opens. The lock nuts 39 may be loosened and then the studs 37 adjusted for increasing or decreasing the compression of the springs 36. This controls the resilient reaction against the weights 24.

It should be understood that when the driver hub housing 10 reaches a predetermined speed the automatic clutch closes and remains closed for all speeds above this predetermined speed. When the speed of the driver hub housing falls to and below this predetermined speed the clutch automatically opens.

While I have illustrated and described the preferred embodiments of my invention, it is to be understood that I do not limit myself to the precise construction herein disclosed and the right is reserved to all changes and modifications coming within the scope of the invention as defined in the appended claim.

Having thus described my invention, what I claim as new and desire to secure by United States Letters Patent is:

An automatic clutch, comprising a driver hub housing having a tubular central section for engagement on a driver shaft and a container section coaxially about said tubular central section, a driven hub housing for engagement on a driven shaft, friction members connected with said housings and engageable with each other for transmitting rotations from said driver housing to said driven housing, a pressure member slidably mounted on and splined with said tubular central section and located within said container section and extending out and against said friction members for engaging said friction members with each other when moved outwards, a rack connected with said pressure member and extending longitudinally of the axis of said tubular central section, a radial pin mounted on and within said container section, a weight slidably mounted on said pin, a gear train connecting said weight and said rack for moving said pressure member outwards when said weight moves outwards by centrifugal force while said driver housing rotates, a spring connected with said pressure member for urging it inwards and extending parallel to the axis of said tubular central section, and an adjustment screw for controlling the tension of said spring connected with said spring and also extending parallel to the axis of said tubular central section and adjustably mounted on and through said container section for controlling the tension of said spring from the exterior of said container section.

GEORGE GISONNO.

REFERENCES CITED

The following references are of record in the file of this patent:

UNITED STATES PATENTS

| Number | Name | Date |
|---|---|---|
| 736,277 | Lombard | Aug. 11, 1903 |
| 982,042 | Ellett | Jan. 17, 1911 |
| Re. 20,426 | Banker | June 29, 1937 |
| 2,089,870 | Young | Aug. 10, 1937 |
| 2,217,357 | Coe | Oct. 8, 1940 |